March 5, 1968     H. GRAMESPACHER     3,371,566
TOOLHOLDER

Filed Dec. 16, 1965        2 Sheets-Sheet 1

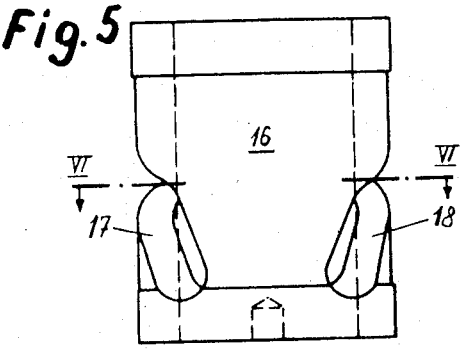
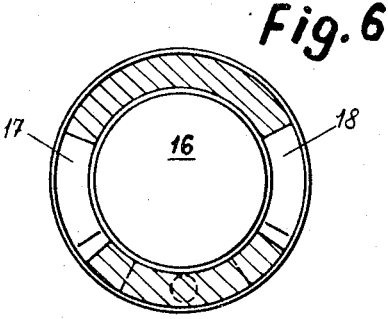
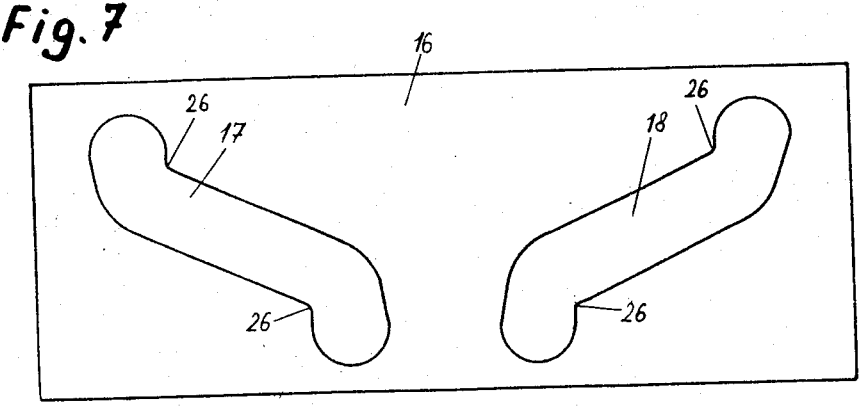
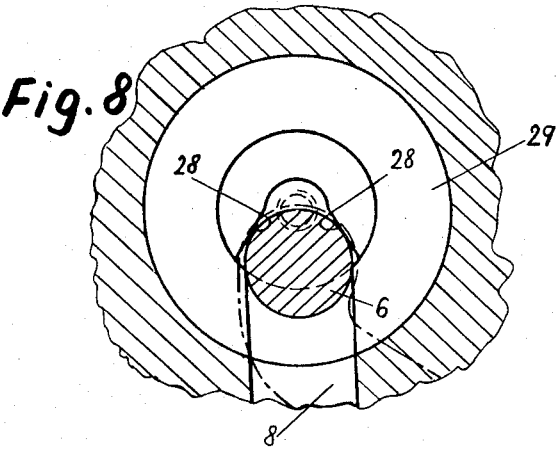

United States Patent Office 3,371,566
Patented Mar. 5, 1968

3,371,566
TOOLHOLDER
Herbert Gramespacher, Schaffhausen, Switzerland, assignor to Georg Fischer Aktiengesellschaft, Schaffhausen, Switzerland
Filed Dec. 16, 1965, Ser. No. 514,235
Claims priority, application Switzerland, Dec. 30, 1964, 16,827/64
2 Claims. (Cl. 82—36)

ABSTRACT OF THE DISCLOSURE

The present invention relates to a hydraulically operable turnable toolholder, by means of which the machining tool is turnable about an axis and is held in its respective adjusted working position. The toolholder according to the present invention is characterized primarily in that a rotary piston fixedly connected to the toolholder has rotatably and axially displaceably mounted thereon a sliding member the circumferential portion of which is provided with two inclined slots having shortly ahead of their ends a sharp bend. From these bends the said slots extend to the ends thereof slightly inclined with regard to the axis of rotation of the rotary piston. The toolholder according to the present invention is furthermore characterized in that a bolt fixedly connected to a rotary piston, and a pivot fixedly connected to the housing are guided for reciprocatory movement in said two slots while said bolt is additionally guided in a semicircular groove in a housing. The said two slots are arranged in the sliding member with regard to the engaging surface of two abutments in such a way that the bolt connected to a rotary piston will, when the toolholder has been turned into the range of its working operation, engage the wall of a slot and the contacting surface of one abutment, said bolt being arrested or clamped fast by hydraulic pressure acting upon the sliding member.

The present invention relates to a toolholder and, more specifically, to a hydraulically operable turnable toolholder, by means of which the machining tool is turnable about an axis and is held in its respective adjusted working position. Turnable toolholders are known by means of which two diametrically oppositely located machining tools are tiltable each time by 180° into the working range of the workpiece to be machined for roughening and for smoothing respectively. After the machining tool has been turned into its respective working position, means are provided for arresting and holding the machining tool in its respective position.

It is an object of the present invention to provide a toolholder which while being turnable about 180° in clockwise and counterclockwise direction will be considerably simpler in construction than heretofore known toolholders of the type involved.

It is another object of this invention to provide a toolholder as set forth in the preceding paragraph, which does not require special arresting means for holding the toolholder in its respective adjusted position.

These and other objects and advantages of the invention will appear more clearly from the following specification in connection with the accompanying drawings, in which:

FIG. 5 is a top view of a sliding member used in connection with the present invention.

FIG. 6 illustrates a section through the sliding member of FIG. 5, said section being taken along the line VI—VI of FIG. 5.

FIG. 7 is a development of a tubular sliding member part.

FIG. 8 is a section taken along the line VIII—VIII of FIG. 3, but on a larger scale than that of FIG. 3.

The toolholder according to the present invention is characterized primarily in that a rotary piston fixedly connected to the toolholder has rotatably and axially displaceably mounted thereon a sliding member the circumferential portion of which is provided with two inclined slots having shortly ahead of their ends a sharp bend. From these bends the said slots extend to the ends thereof slightly inclined with regard to the axis of rotation of the rotary piston. The toolholder according to the present invention is furthermore characterized in that a bolt fixedly connected to a rotary piston, and a pivot fixedly connected to the housing are guided for reciprocatory movement in said two slots while said bolt is additionally guided in a semicircular groove in a housing. The said two slots are arranged in the sliding member with regard to the engaging surface of two abutments in such a way that the bolt connected to a rotary piston will, when the toolholder has been turned into the range of its working operation, engage the wall of a slot and the contacting surface of one abutment, said bolt being arrested or clamped fast by hydraulic pressure acting upon the sliding member.

Figure 1:
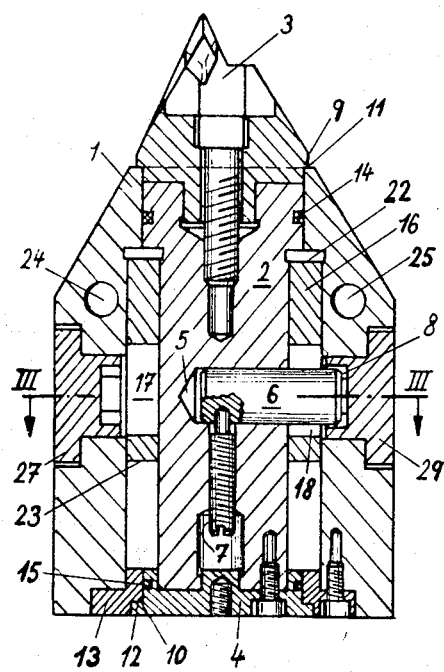
FIG. 1 is a section through a turnable toolholder according to the invention, said section being taken along the line I—I of FIG. 2.

Referring now to the drawings in detail, the toolholder illustrated therein comprises a housing 1 having two bores 24 and 25 through which in a manner known per se screw bolts may be passed for connecting the toolholder to a carriage reciprocable in axial direction of the turning axis of the toolholder. FIG. 1 in particular illustrates the mounting of a rotary piston 2 in housing 1 of the toolholder. One end of the rotary piston 2 is screwed to the holding device 3 for the machining tools, whereas the other end of rotary piston 2 is likewise by means of screws fixedly connected to a disc-shaped closure plate 4. Approximately in the intermediate range of rotary piston 2 there is provided a bore 5 in which a bolt 6 is nonmovably and fixedly arranged. Bolt 6 is secured against displacement and rotation by means of a threaded pin 7. Housing 1 has a semicircular groove 8 for guiding one end of bolt 6, said bolt being adapted to circumscribe a semicircular path in said groove 8. Rotary piston 2 is with regard to housing 1 secured against axial displacement in such a way that the holding device 3 and the closure plate 4 are each provided with a recess 9 and 10 resting against sliding surfaces 11 and 12 of housing 1 and of a guiding ring 13 connected to housing 1. Guiding ring 13 and closure plate 4 have sliding surfaces forming a part of a sliding bearing.

In order to reduce leakage losses to a permissible degree, the bearing surfaces of rotary piston 2 are in a manner known per se provided with sealing rings 14 and 15 located in annular grooves. A tubular sliding member 16 (FIGS. 5, 6 and 7) is rotatably and axially movably guided on rotary piston 2. The circumferential surface of sliding member 16 has two oppositely located inclined slots 17 and 18. Slot 17 is guided on a stud 19 (FIG. 3) which is fixedly connected to housing 1, whereas bolt 6 connected to rotary piston 2 is guided in slot 18.

A very important feature of the present invention consists in the provision of the two slots 17 and 18 in sliding member 16. At both ends of said slots 17 and 18 or shortly ahead of said ends of said slots there are provided sharp bends 26 from which said slots extend to their ends at a less inclination with regard to the axis of rotation or rotary piston 2. The purpose of this arrangement is primarily to bring about an arresting of toolholder 3 when the toolholder is turned out of its working range. More specifically, this arresting action is to be effected by a cooperation of abutments 27 and 29 with engaging surfaces 28. In this way a non-desired rotary movement of the toolholder 3 will be prevented because, as mentioned above, the slots 17 and 18 are at their ends approximately axis-parallel to the axis of rotation of rotary piston 2, while bolt 6 is arrested or clamped fast when the toolholder 3 is turned into its working position. This last mentioned arresting action is effected by hydraulic pressure acting upon sliding member 16. Bolt 6 will be clamped fast between engaging surfaces 28 of the abutments 27 and 29 and the approximately axis-parallel wall of slot 18. The abutments 27 and 29 are connected to the housing 1 in a manner known with screw bolts, not shown in the drawing.

Figure 2:
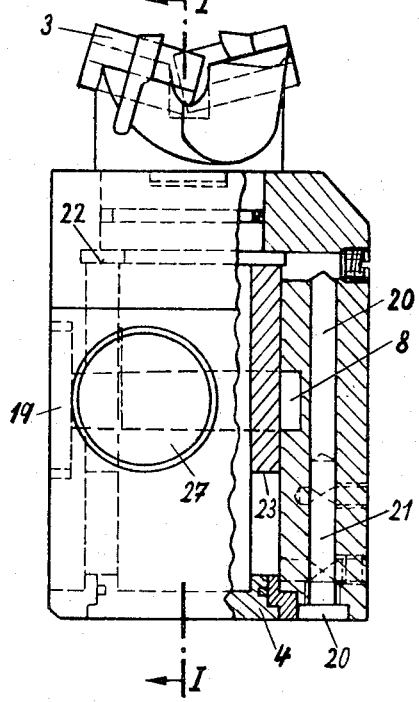
FIG. 2 is a partial section through the hydraulic system of the toolholder according to the invention.
Figure 3:
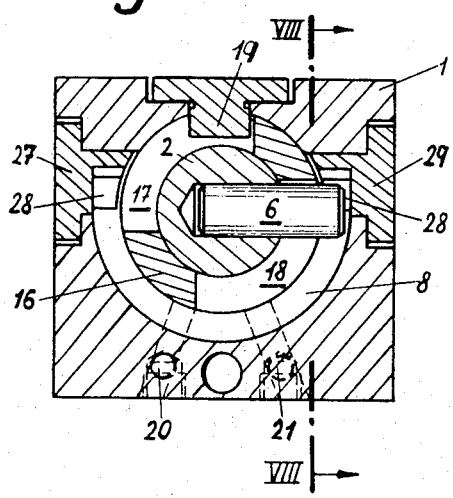
FIG. 3 represents a section along the line III—III of FIG. 1.
Figure 4:
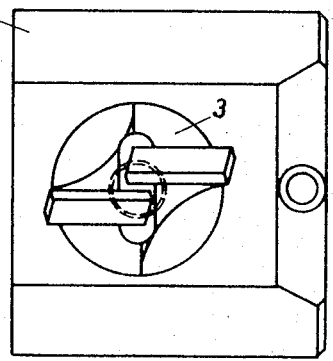
FIG. 4 is a top view of the toolholder according to the invention.

FIG. 2 shows two conduits 20 and 21 which in a manner known per se through the intervention of control members, such as valves or the like, are adapted to be connected to a hydraulic power source. Depending on the direction of rotation of toolholder 3, sliding member 16 with its annular surfaces 22 or 23 is acted upon by hydraulic pressure through conduits 20 and 21 while the above mentioned control means are adapted to return the hydraulic medium, for instance oil, to an oil collecting container not shown in the drawing. FIG. 3 primarily illustrates the course of movement of the axially displaceable sliding member 16 which is turnable by 90° and also illustrates bolt 6 which is turnable by 180°.

The operation of a toolholder according to the present invention is as follows. In order to impart upon toolholder 3 a turning movement of 180°, sliding member 16 (FIG. 1) is displaced from the left-hand side to the right-hand side. In this connection sliding member 16 and annular surface 22 of sliding member 16 are acted upon by hydraulic pressure through conduit 20 while the oil which is in an annular chamber on the side of annular surface 23 is pressed out of said chamber and returned to an oil collecting vessel through conduit 21 and through valves not shown in the drawing. If, however, the sliding member is to be displaced in opposite direction, the oil will in the same manner as described pass into an oil collecting vessel from the annular chamber adjacent the annular surface 22.

During the axial displacement of sliding member 16 as effected by hydraulic pressure, slot 17 is passed from one end to the other end by the fixedly arranged stud 19 (FIG. 3) whereby sliding member 16 simultaneously carries out a turning movement by 90°. This course of movement of sliding member 16 will cause bolt 6 to carry out a turning movement by 180° within the range of the semicircular groove 8, said turning movement being brought about on one hand by the inclination of slot 18 and on the other hand by the rotary and axial movement of sliding member 16.

In view of the simple structure of the turnable toolholder according to the invention and the elimination of a separate arresting device, the manufacturing cost for a toolholder according to the present invention are considerably reduced over those of heretofore known toolholders. Moreover, in view of the advantageous structure of the toolholder according to the invention, it is possible to reduce any disorders and also the time required for the turning movements.

It is, of course, to be understood that the present invention is, by no means, limited to the particular construction set forth above but also comprises any modifications within the scope of the appended claims.

What I claim is:

1. A toolholder, especially for moving each one of two tools alternately into and out of its effective position for machining a work piece, which includes: housing means, a supporting member rotatably but axially non-displaceably journalled in said housing means and adapted to receive a tool support for connection therewith, said supporting member being rotatable from a first effective position to a second position, and vice versa, a pressure fluid operable sliding member rotatably and axially slidably surrounding said supporting member and provided with two circumferentially spaced slots inclined in opposite direction with regard to each other and with regard to the axial direction of said supporting member, each end portion of each of said slots forming an obtuse angle with regard to that portion of the same slot which is located between said end portions, bolt means fixedly connected to said supporting member and extending in radial direction thereof into and through one of said slots so as to be guided therein, stud means fixedly connected to said housing means and extending into the other one of said slots for guiding engagement therewith, said housing means also being provided with a substantially semi-circular groove arranged in substantial alignment with said bolt means along a plane passing through the longitudinal axis of said bolt means and extending transverse to the longitudinal extension of said supporting member, said bolt means extending into and being movable in said groove from a position at one end portion thereof corresponding to said first effective position of said supporting member to a position at the other end portion of said groove corresponding to said second effective position of said supporting member, and vice versa, and abutment means connected to said housing means and respectively arranged at the ends of said semi-circular groove and near said end portions of said slots to thereby permit said pressure fluid operable sliding member to clamp said stud means in its position corresponding to the respective first and second effective positions of said supporting member.

2. A toolholder according to claim 1, in which said pressure fluid operable sliding member is formed by a sleeve the end faces of which together with said housing means and the adjacent surface area of said supporting member respectively confine two opposite located annular chambers, and conduit means respectively communicating with said annular chambers for respectively alternately admitting and discharging actuating fluid.

References Cited

FOREIGN PATENTS 911,317 11/1962 Great Britain.

LEONIDAS VLACHOS, *Primary Examiner.*